United States Patent [19]
Lagoni et al.

[11] Patent Number: 5,210,606
[45] Date of Patent: May 11, 1993

[54] APPARATUS FOR CORRECTING DISTORTED SYNC IN A COMPOSITE VIDEO SIGNAL

[75] Inventors: William A. Lagoni; Roger L. Lineberry, both of Indianapolis, Ind.

[73] Assignee: Thomson Consumer Electronics, Inc., Indianapolis, Ind.

[21] Appl. No.: 516,152

[22] Filed: Apr. 30, 1990

[51] Int. Cl.$^5$ ............................................. H04N 5/04
[52] U.S. Cl. ................................... 358/148; 358/160; 358/164
[58] Field of Search .................. 358/164, 168, 169, 36, 358/37, 148, 141, 160

[56] References Cited
U.S. PATENT DOCUMENTS

| | | | |
|---|---|---|---|
| 2,227,050 | 12/1940 | White et al. | 358/160 |
| 4,489,349 | 12/1984 | Okada | 358/164 |
| 4,583,120 | 4/1986 | Murakami et al. | 358/166 |
| 4,667,234 | 5/1987 | Kluth | 358/166 |

FOREIGN PATENT DOCUMENTS 0941731 11/1963 United Kingdom ................ 358/164

OTHER PUBLICATIONS
Data sheet Sony CX20125 IC.
Section 13-3-1. "Black level correction (dynamic black) circuit", p. 71 of technical description of G7U.

Primary Examiner—James J. Groody
Assistant Examiner—David E. Harvey
Attorney, Agent, or Firm—Joseph S. Tripoli; Peter M. Emanuel

[57] ABSTRACT

A television receiver includes a "one-chip" television signal processing IC which has a terminal for receiving a composite video signal including both image and synchronization pulse components. A composite video signal which has been non-linearly processed by a so-called "black-stretch" circuit is coupled to the composite video signal input terminal of the "one-chip" IC. In order that a sync separator of the "one-chip" IC can reliably separate the synchronization pulses from the composite video signal after it has been non-linearly processed, a sync correction circuit, including an auxiliary sync separator, is used to modify the synchronization pulses of the composite video signal after it is non-linearly processed and before it is coupled to the "one-chip" television IC.

7 Claims, 11 Drawing Sheets

APPARATUS FOR CORRECTING DISTORTED SYNC IN A COMPOSITE VIDEO SIGNAL

FIELD OF THE INVENTION

The present invention relates to apparatus for correcting the synchronizing (sync) pulse portion of a composite luminance signal after the sync portion has been corrupted by a non-linear processing circuit which is used to process the composite luminance signal.

BACKGROUND OF THE INVENTION

In a television receiver, it is often desirable to use non-linear signal processing in order to improve the subjective appeal of displayed images. So called "black stretch" and "white stretch" circuits are used to improve the image contrast ratio by adaptively altering the shape of a signal transfer function in the dark and bright image areas, respectively. So called gamma correcting circuits also alter a signal transfer function in a non-linear manner, either statically or dynamically, to compensate for differences between the non-linear characteristics of television cameras utilized in broadcast studios and the non-linear characteristic of the display device of a receiver. So-called "auto-pedestal" circuits are also used to adaptively adjust the brightness of a displayed image by inserting a "blacker-than-black" variable amplitude pulse during the back- porch region of the luminance signal. The brightness of a displayed image is altered because the "auto-pedestal" function changes the relationship between the clamping level of a "back-porch" clamp and the level of the video signal which is clamped. If the synchronization component and the image component of a video signal are processed together, each of these "picture enhancement" circuit techniques may impact the ability of a synchronizing pulse separator to distinguish between the "blacker-than-black" sync pulses and the image portion.

Figure 1:
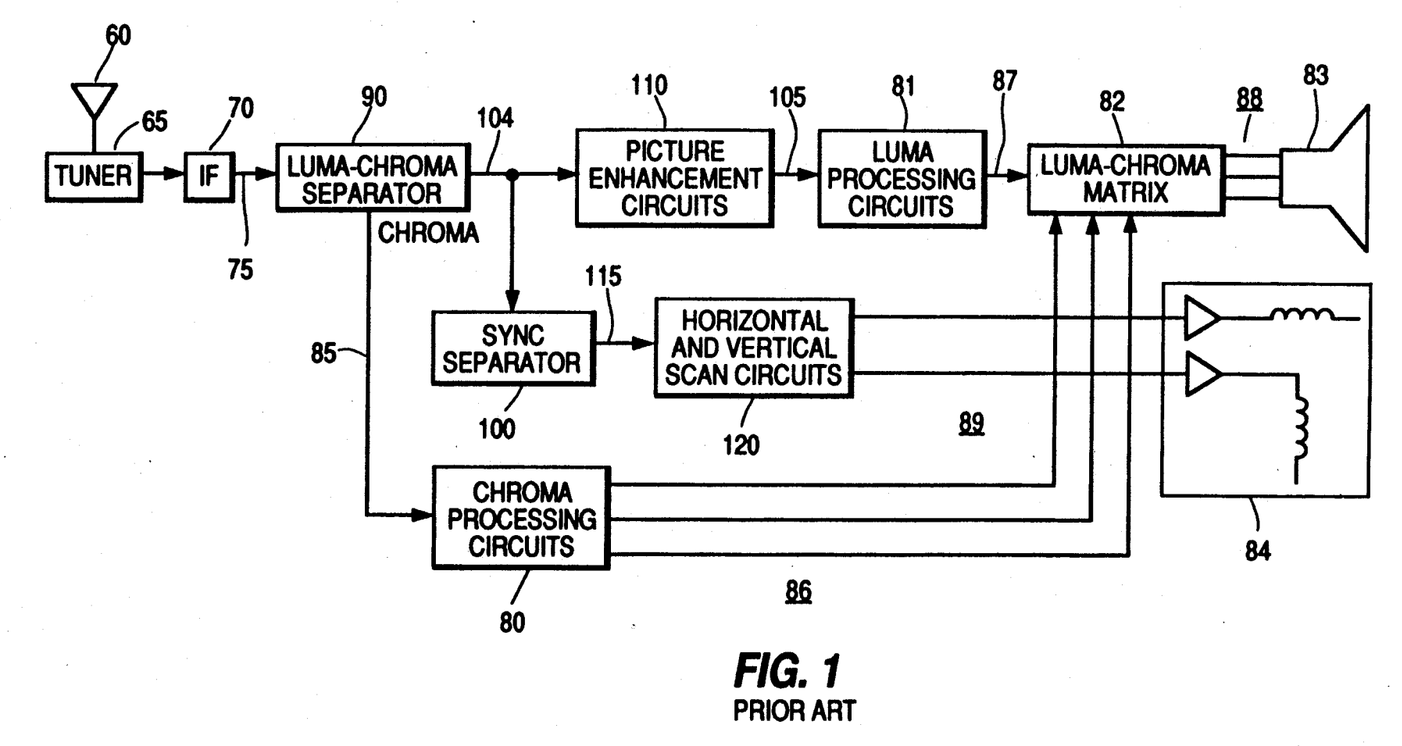
FIG. 1 shows a block diagram of a television receiver arranged so that sync separation occurs prior to non-linear processing as is known in the prior art.

FIG. 1 shows a typical application of a non-linear "picture enhancement" circuit. In this example, a television signal received by an antenna 60 is tuned by a tuner 65 and demodulated by IF section 70 to produce a baseband video signal 75. This signal is separated into a composite luminance (luma) signal 104, containing both image and sync pulse components, and a chrominance (chroma) signal 85 by a luma-chroma separator 90. The chroma signal is processed by processing circuits 80 to produce color difference signals 86. Color difference signals 86 are matrixed with a luma signal 87 produced by a luma processor 81 in luma-chroma matrix 82 to produce primary color signals 88 suitable for application to a picture tube 83. A non-linear "picture enhancement" circuit 110 precedes luma processing circuit 81 and supplies to it a non-linearly processed luma signal 105. Composite luma signal 104 produced by luma-chroma separator 90 is coupled in parallel fashion to picture enhancement circuit 110 and a sync separator 100. Separated sync signal 115 is applied to horizontal and vertical scan processing circuit 120, which in turn provide deflection signals 89 to a deflection unit 84.

The arrangement shown in FIG. 1 has the desirable feature that sync separator 100 derives the composite sync signal from composite luma signal 104 before it is processed by non-linear picture enhancement circuit 110. A similar arrangement is disclosed with respect to FIG. 12 of U.S. Pat. No. 4,489,349 issued to Okada on Dec. 18, 1984 and assigned to the Sony Corporation.

Figure 2A:
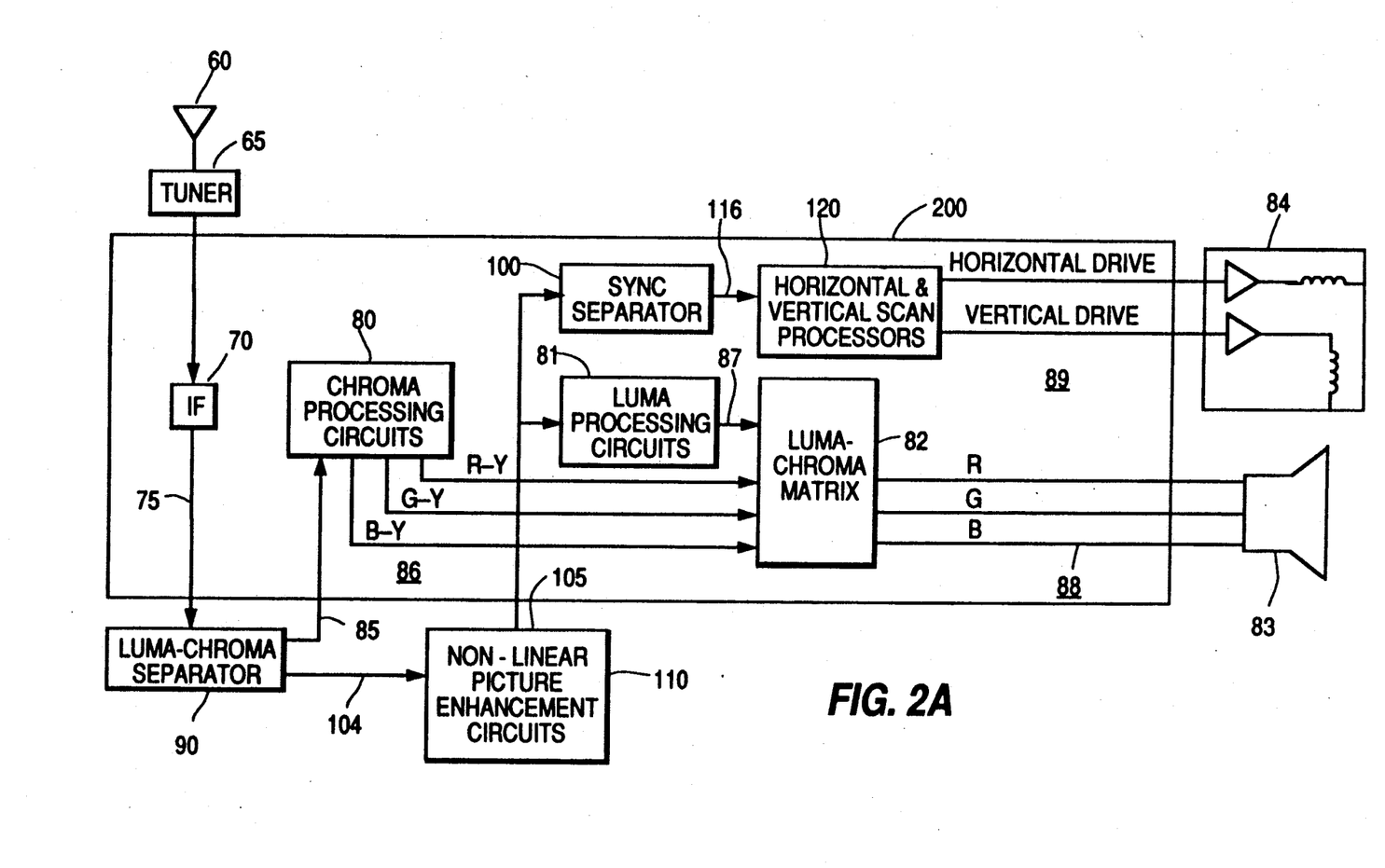
FIG. 2a shows a configuration of a receiver using a picture enhancement circuit with a "one-chip" television IC and is useful in understanding the problem to which the present invention is directed.

As shown in FIG. 2A, the use of a picture enhancement circuit in conjunction with a combined television processor integrated circuit (IC), often called a "one-chip" television IC, such as the Toshiba TA8680 necessitates that the input signal to sync separator 100 be derived from the output signal of picture enhancement circuit 110. This is due to the fact that in ICs such as the TA8680, the inputs to sync separator 100 and luma processing circuit 81 are connected together within the IC and are not accessible separately.

Figure 2B:
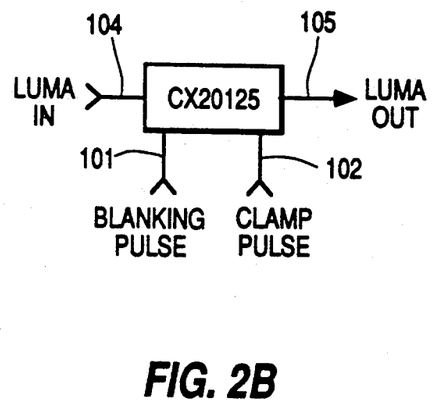
FIG. 2b shows the connection of the Sony CX20125 non-linear picture enhancement IC.

An example of an IC providing "black-stretch" and "auto-pedestal" functions, which may be used in the arrangements shown in FIGS. 1 and 2A is the Sony CX20125 dynamic picture IC. As shown in FIG. 2B, the CX20125 IC receives a composite luminance signal 104, a composite horizontal and vertical retrace blanking signal 101 and a horizontal "back-porch" clamping pulse signal 102 at respective inputs. In response, it provides a composite luminance signal 105 which has been non-linearly processed in accordance with a "black-stretch" function. In addition, an "auto-pedestal" pulse is added to the "back-porch" of the composite luminance signal. The clamping pulse signal is used to provide back-porch clamping for its own signal processing as well as to aid in generation of the "auto-pedestal" pulse. The CS20125 IC uses the composite retrace blanking signal to inhibit black-stretch during horizontal and vertical blanking intervals. Such retrace blanking interval inhibiting provisions for a non-linear processing system are also disclosed with respect to FIG. 11 of the aforementioned Okada patent.

Figure 3:
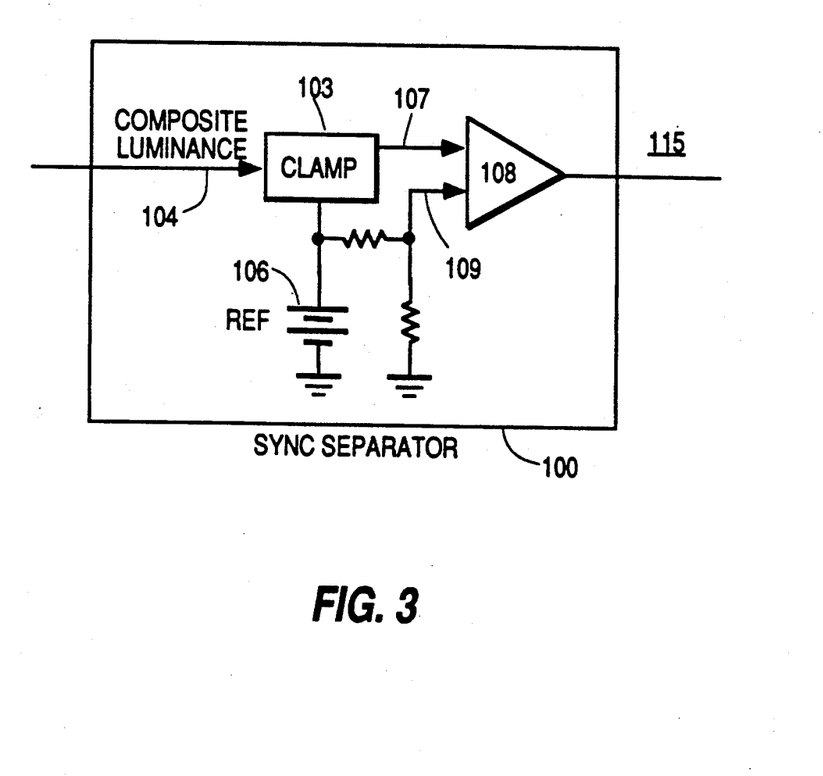
FIG. 3 shows a block diagram of a sync separator.

To understand how a problem in deriving the composite sync signal arises when the arrangement of FIG. 2B is used, it will be helpful to review the operation of separating the composite sync pulses from the composite luminance signal. Reference will be made to FIG. 3 during this description. The typical syn separator arrangement includes a clamp 103 to restore the DC level of the composite luma signal, after it is AC coupled through a capacitor (not shown), by clamping the peaks of the sync pulses to a reference voltage 106. The signal 107 so restored is applied to a level comparator 108 having a reference voltage 109 which is related to reference voltage 106 of clamp 103. By choosing reference voltage 109 of comparator 108 to be at an intermediate level between the "back-porch" level and the expected sync tip level, a composite horizontal and vertical sync pulse signal without any artifacts of the image related video signal will be produced at an output 115 of comparator 108.

Figure 4A:
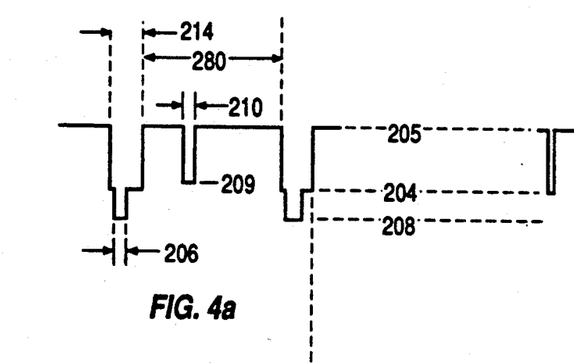
FIGS. 4a and 4b show waveforms of horizontal and vertical portions, respectively, of a composite luminance signal before it is processed by a picture enhancement circuit, such as the Sony CX20125.
Figure 4B:
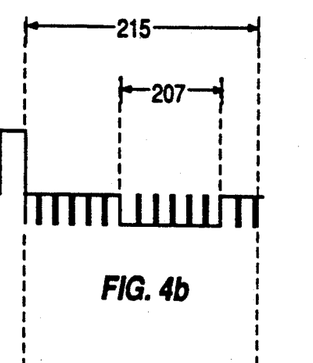

The horizontal and vertical portions of a typical composite luminance signal are shown in FIGS. 4a and 4b, respectively. Image portion 280 of the composite luminance signal extends from blanking level 204 to peak white level 205, while horizontal sync pulses 206 and the vertical sync pulses 207 extend below blanking level 204 to sync tip level 208. The NTSC television standard specifies that the amplitude between blanking level 204 and sync tip level 208 should be 40% of the amplitude between blanking level 204 and peak white level 205. This sync amplitude relationship provides adequate margin for any inaccuracy of the sync separator and allows the sync component to be reliably separated from the image component.

Figure 6A:
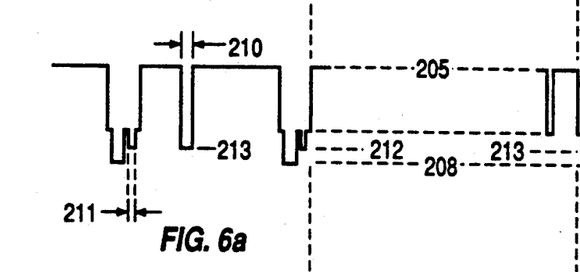
FIGS. 6a and 6b show waveforms of horizontal and vertical portions, respectively, of a composite luminance signal after it has been processed by the CX20125 IC.
Figure 6B:
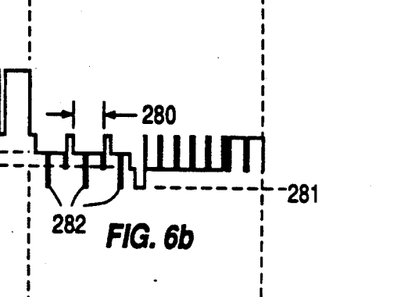

The horizontal and vertical portions of a composite luminance signal which have been processed by a non-linear processing IC such as the the CX20125 are shown in FIGS. 6a and 6b, respectively. In contrast to the waveform of FIG. 4a, note that the waveform of FIG. 6a has a pulse 211 inserted during the back-porch interval following horizontal sync pulse 206. This inserted pulse is a variable amplitude "auto-pedestal" pulse. The amplitude of the auto-pedestal pulse typically varies from blanking level 204 to a maximum level 212. Level 212 is about 50% of the amplitude between sync tip level 208 and blanking level 204. The waveform shown in FIG. 4a includes a dark portion 210 during active scan time. This dark image region extends to a level 209, which is "whiter" than the "blacker-than-black" blanking level 204. If the total time duration of dark image regions is relatively large during a field, "black-stretch" processing will extend level 209 to a black level or even to blacker-than-black blanking level 204. For relatively short durations, "black-stretch" processing will extend dark level 209 to a level 213 below blanking level 204 as shown in FIG. 6a.

Figure 5A:
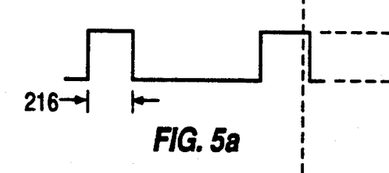
FIGS. 5a and 5b show waveforms of horizontal and vertical retrace blanking signals, respectively.
Figure 5B:
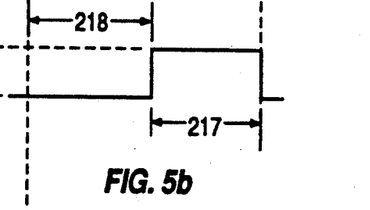

The horizontal and vertical retrace blanking intervals are shown in FIGS. 5a and 5b, respectively. Comparing the waveforms of FIGS. 4a and 5a, it will be noted that the horizontal blanking interval 214 of the received signal and the retrace blanking interval 216 are approximately coincident. However, comparing the waveforms of FIGS. 4b and 5b, it will be noted that vertical retrace blanking interval 217 is considerably shorter than the vertical blanking interval 215 of the received signal. This is a result of typical receiver design practice since it allows for a more economical structure and usually causes no problem. However, in receivers using IC such as the CX20125, the short vertical retrace blanking interval results in the response shown in FIG. 6b because "black-stretch" processing is not inhibited during interval 218 between the beginning of blanking interval 215 of the received signal and the beginning of retrace blanking interval 217. As shown in FIG. 6b, the horizontal trace portions which occur during interval 218 may be stretched from their normal level 204 to the blacker-than-black level 213. In a similar manner, the vertical equalizing pulses 282 which occur during interval 218 may be stretched from level 208 to level 281. In this regard, it is noted that while the equalizing pulses are stretched, the horizontal pulses occurring during interval 218 are not stretched because "black-stretch" processing is inhibited during horizontal blanking intervals. Just as black region 210 shown in FIG. 4a is sometimes stretched depending on the total duty cycle of black image regions, the horizontal trace regions which occur during interval 218 may be kept at blanking level 204 or extended towards maximum extension levels 213 or 281 depending upon variations of scene content. Thus, the margin for setting the sync separator comparator reference level is between sync tip level 208 and the lower of levels 212 or 213 for horizontal sync pulses, and is not predictable for vertical sync pulses. It is thus difficult to set a reliable comparator reference.

SUMMARY OF THE INVENTION

The present invention partially resides in the recognition of the problem of the corruption of the sync pulse component of a composite video signal which has been processed by a non-linear picture enhancement circuit.

According to an aspect of the invention, a composite signal is coupled in parallel fashion to the non-linear video processing circuit and to an auxiliary sync separator circuit. The composite horizontal and vertical sync pulses produced by the auxiliary sync separator are used, according to various other aspects of the invention, to either augment or replace the corrupted sync pulses of the non-linearly processed composite video signal. The resulting composite video signal, having had its synchronizing component corrected, is coupled to a "one-chip" television IC. Accordingly, horizontal and vertical synchronizing pulses can now be reliably separated from the image component.

BRIEF DESCRIPTION OF THE DRAWING

For a detailed understanding of the invention, reference should be made to the accompanying Drawing. In the Drawing, the same reference numbers have been assigned to the same or similar elements. FIGS. 1, 2a, 2b, 3, 4a, 4b, 5a, 5b, 6a and 6b have already been described in detail above. In Summary:

DETAILED DESCRIPTION OF THE PREFERRED EMBODIMENT

Figure 7:
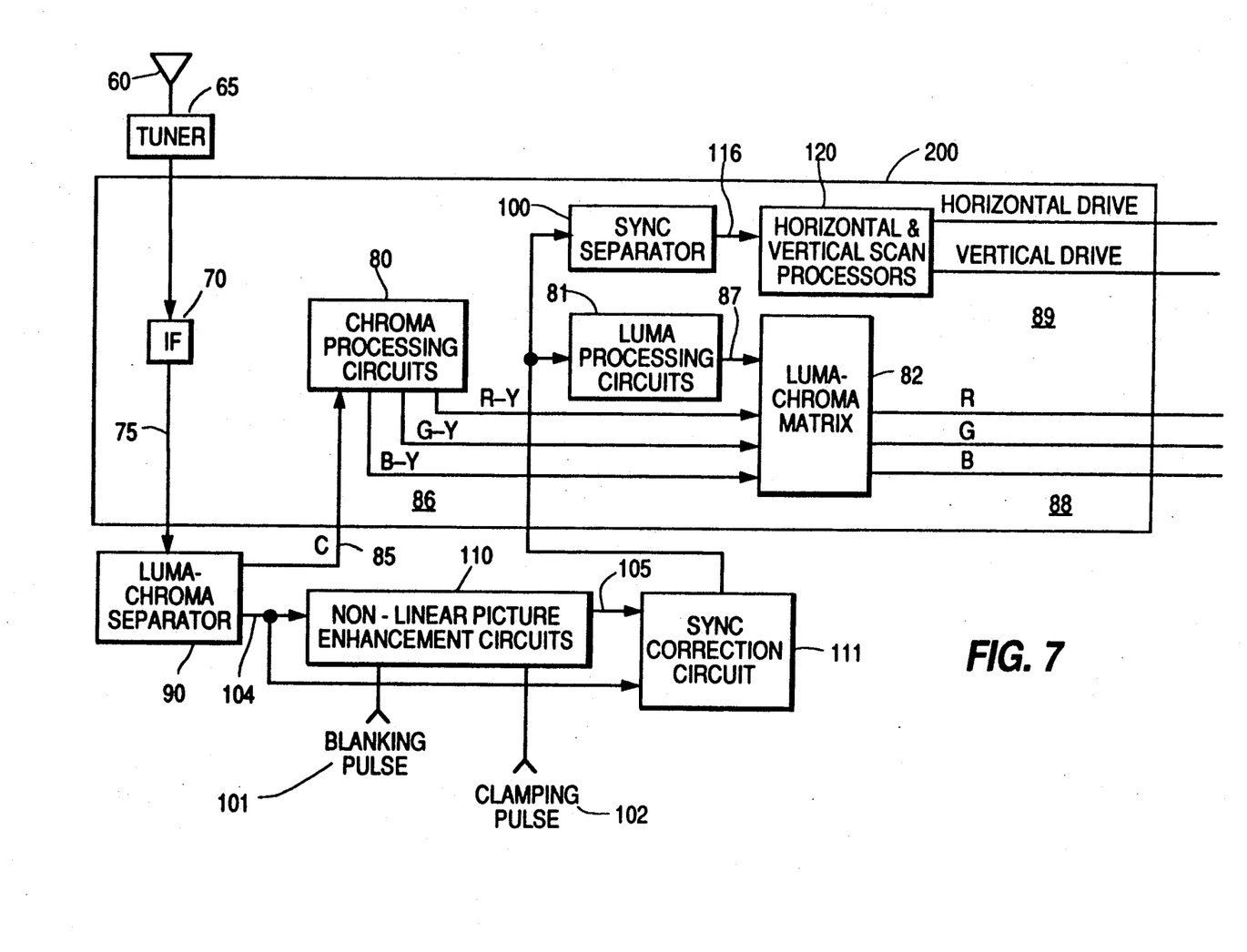
FIG. 7 shows a block diagram of an embodiment of the invention in which a sync correction circuit is interposed between the output of a non-linear signal processing IC and the combined luminance/sync input of a "one-chip" television IC.
Figure 11A:
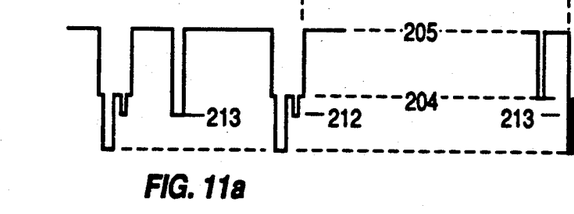
FIGS. 11a and 11b show waveforms of horizontal and vertical pulses, respectively, of a composite luminance signal which is produced at the output of the sync correction circuit shown in FIG. 7.
Figure 11B:
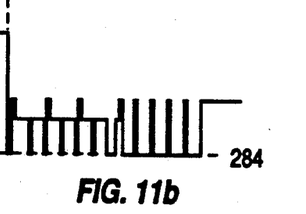

Referring to FIG. 7, composite luma signal 104, derived by chroma-luma separator 90, is applied to the input of non-linear processing circuit 110, e.g., comprising the Sony CX20125 IC, and in parallel fashion to a sync correction circuit 111. Sync correction circuit 111 also receives non-linearly processed composite luma signal 105 produced at the output of non-linear processing circuit 110. Composite luma signal 105 contains the corrupted sync portions as is shown in FIGS. 6a and 6b referred to above. Composite luma signal 112 produced at the output of sync corrector 111 has its sync portions corrected as is shown in FIGS. 11a and 11b. As a result, sync separator 100 of "one-chip" television IC 200, e.g., comprising the Toshiba TA8680 or a similar IC, can reliably separate the composite sync pulses from composite luma signal 112. The separated sync pulses are coupled to scan processing circuits 120.

Figure 8A:
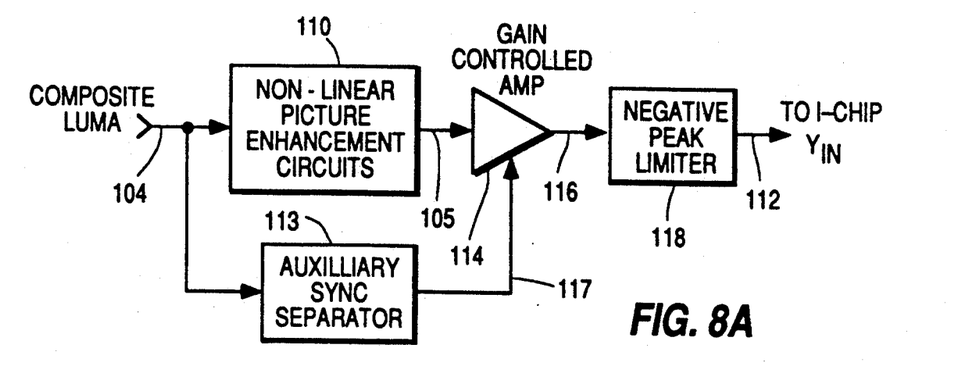
FIGS. 8a, 8b and 8c show block diagrams of various embodiments of the sync corrector shown in FIG. 7.
Figure 8B:
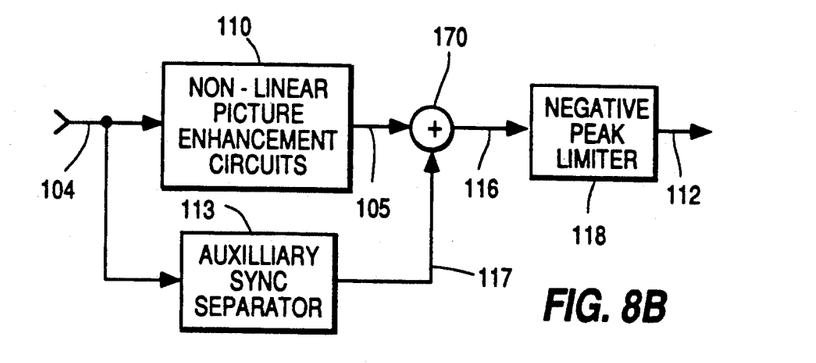
Figure 8C:
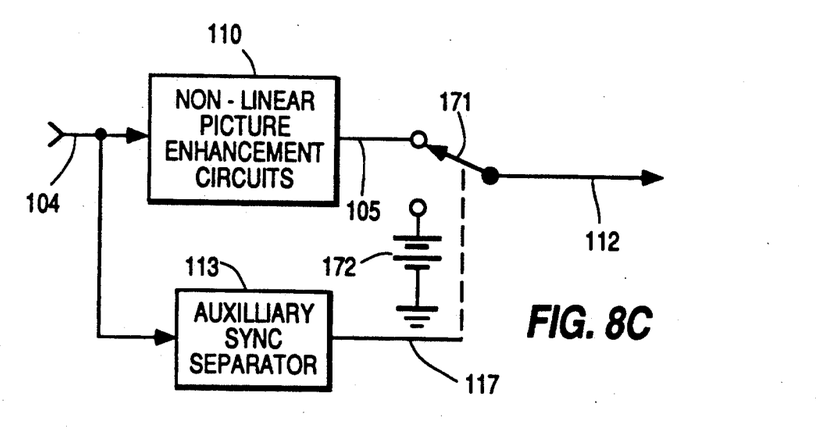
Figure 9A:
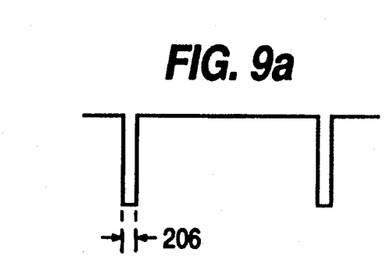
FIGS. 9a and 9b show waveforms of horizontal and vertical sync pulses, respectively, produced by the auxiliary sync separator shown in the arrangement of FIG. 7.
Figure 9B:
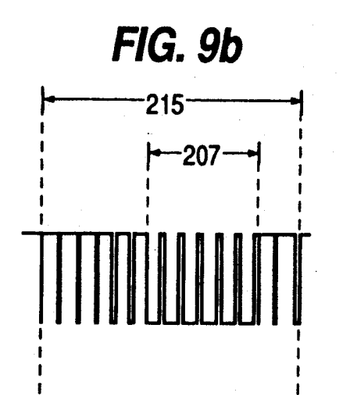

FIGS. 8a, 8b and 8c show alternative forms of the sync corrector 111. Each version includes an auxiliary sync separator 113 which receives composite luma signal 104 which has not been processed by non-linear processing circuit 110. Auxiliary sync separator 113 operates in the manner described above with reference to FIG. 3 to produce an uncorrupted composite sync signal 117, as is indicated in FIGS. 9a and 9b.

Figure 10A:
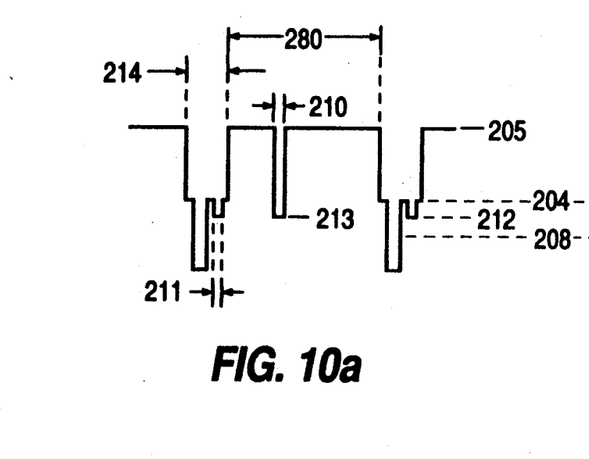
FIGS. 10a and 10b show waveforms of horizontal and vertical portions, respectively, of a composite luminance signal which is produced at an intermediate point of the embodiments shown in FIGS. 8a and 8b.
Figure 10B:
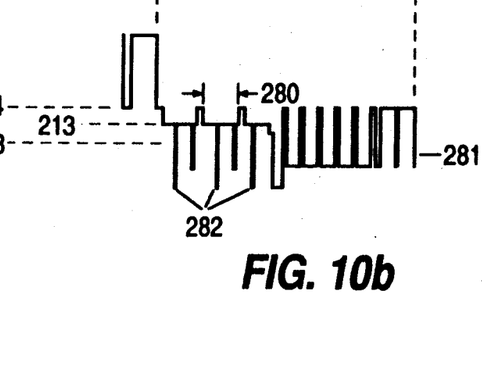

Composite sync signal 117 derived by auxiliary sync separator 113 is used in the embodiment shown in FIG. 8a to increase the gain of an amplifier 114 during the time intervals in which the horizontal sync and equalizing pulses occur. The input signal of amplifier 114 is non-linearly processed composite luma signal 105 having corrupted sync pulses. Output signal 116 of amplifier 114 is a composite luma signal which has its horizontal sync and equalizing pulses amplified, as is indicated in FIGS. 10a and 10b. A negative peak limiter 118 coupled to the output of amplifier 114 causes all of the horizontal sync and equalizing pulses to have equal amplitudes, as is indicated in FIGS. 11a and 11b.

In the embodiment of FIG. 8b, composite sync signal 117 is added to non-linearly processed composite luma signal 105 by an adder 170. Resultant signal 116 is a composite luma signal with its horizontal and equalizing pulses extended as is indicated in FIGS. 10a and 10b. Composite luma signal 116 is negative peak limited by negative peak limiter 118 which provides sync corrected composite luma signal 112.

In the embodiments shown in FIGS. 8a and 8b, negative peak limiter 118 is desirable because composite sync signal 116 produced by gain controlled amplifier 114 of the embodiment of FIG. 8a and adder 170 of the embodiment shown in FIG. 8b, respectively, contains pulses with different amplitudes. This is indicated in FIGS. 10a and 10b. Since DC restoring clamp 103 preceding the threshold comparator 108 of sync separator 100 of IC 200 (see FIG. 3) is operated to clamp the peaks of the input signal, the amplitude region or margin in which the comparison is made is a function of the peak amplitude of the input signal. This may cause unreliable operation of sync separator 100. Negative peak limiter 118 causes all of the pulses of composite luma signal 112 to have the same amplitude and therefore eliminates that problem.

In the embodiment shown in FIG. 8c, the sync pulses of composite sync signal 117 are used to operate a switch 171 which replaces the corrupted sync pulses of non-linearly processed composite luma signal 105 with a reference voltage 172. Reference voltage 172 may be chosen to provide extended amplitude sync pulses. Since all the pulses are replaced with the reference voltage, output signal 112 has pulses of equal amplitude, without the need for negative peak limiter.

In each of the above embodiments, the resulting amplitude of the pulses of composite sync signal 112 is made sufficiently large, in fact larger than the NTSC standard sync, so that sync separator comparator reference voltage can be set to produce reliable switching at a level within the margin between the maximum black extension level 212 or 213 and the extended sync tip levels 284 of composite luma signal 112, as is indicated in FIGS. 11a and 11b.

Figure 8D:
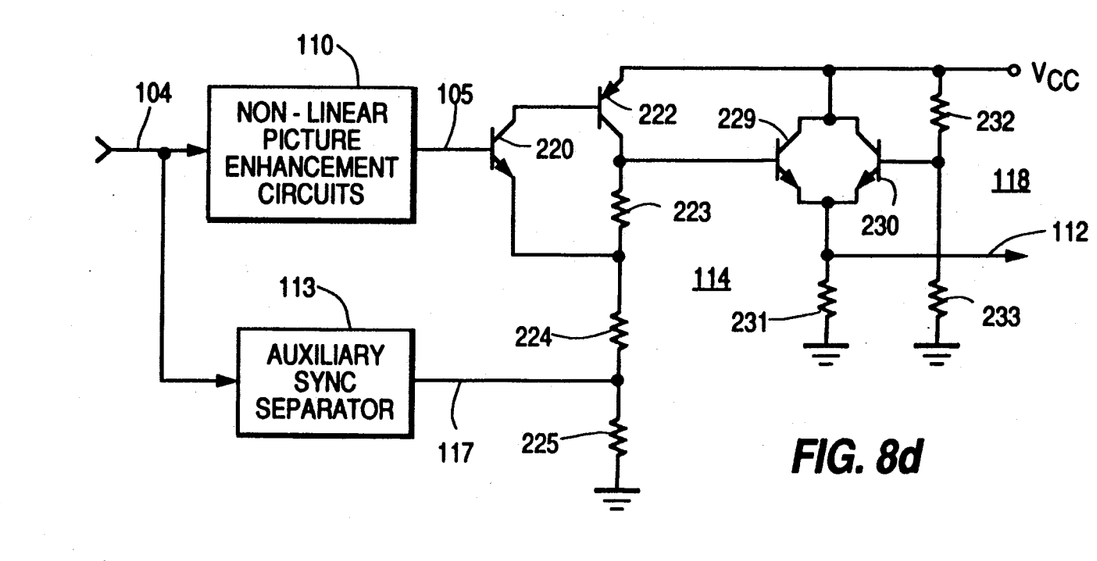
FIGS. 8d, 8e and 8f show circuit implementations of the embodiments shown in block form in FIGS. 8a, 8b and 8c, respectively.

FIG. 8d shows a circuit implementation of the embodiment shown in block form in FIG. 8a. Gain controlled amplifier 114 comprises transistors 220 and 222 operating as a feedback voltage follower with gain greater than unity. The closed loop gain (A) of amplifier 114 is determined by the feedback ratio set by resistors 223, 224 and 225 and is mathematically expressed as:

$$A = 1 + R223/(R224 + R225)$$

The pulses of the output signal of auxiliary sync separator 113 effectively act to short resistor 225 thereby increasing the gain of amplifier 114. Comparator configured transistors 229 and 230, along with an emitter resistor 231 and a bias network comprising resistors 232 and 233, form negative peak limiter 118.

Figure 8E:
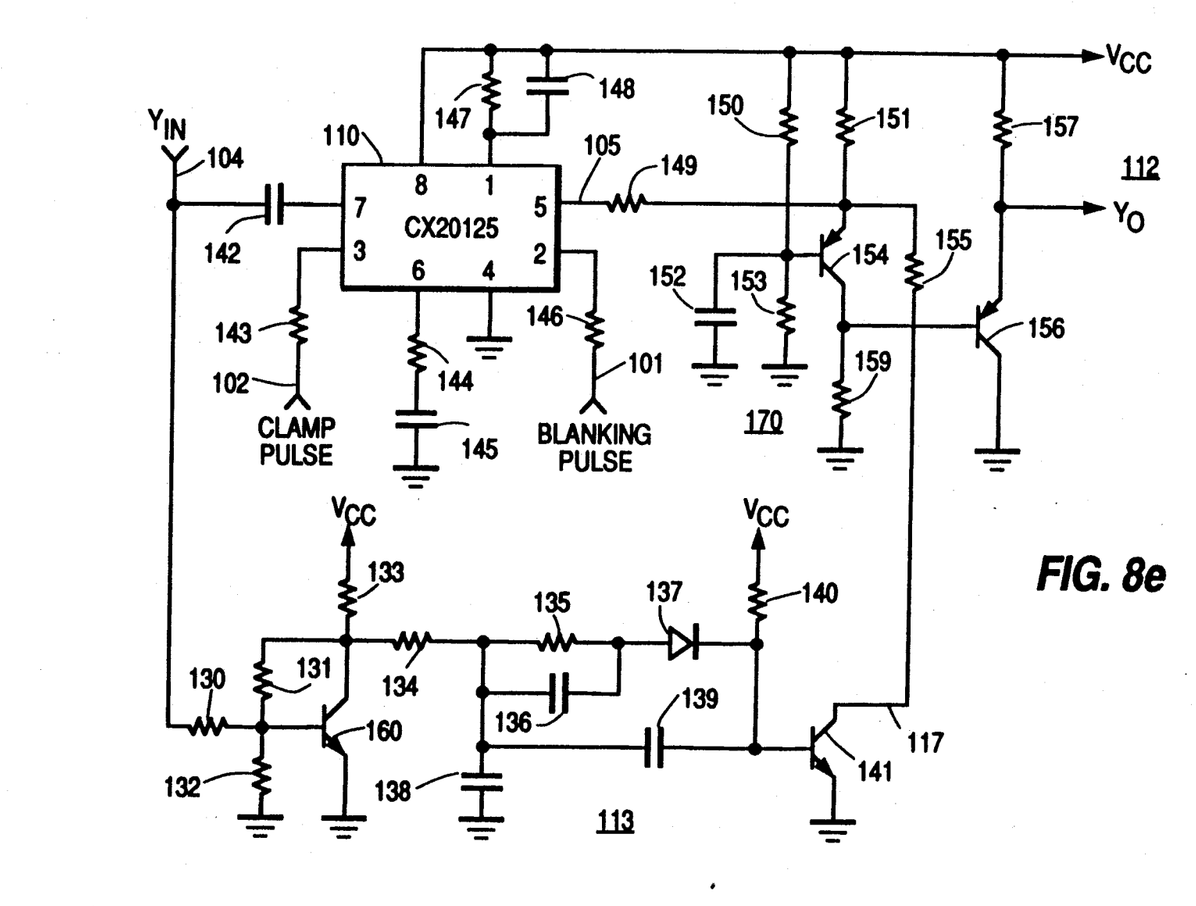

A circuit implementation of the embodiment shown in block diagram form in FIG. 8b is shown in FIG. 8e. As is shown in FIG. 8e, composite luma signal 104 is applied in parallel fashion to auxiliary sync separator 113 and to a nonlinear processing circuit 110, which in the implementation shown in FIG. 8e comprises the CX20125 IC. A capacitor 142 serves as a DC blocking and a clamping storage element for an input clamp within IC 110. A resistor 147 and a capacitor 148 provide a time constant for the "black-stretch" function of the CX20125 IC. A resistor 144 and a capacitor 145 comprise an averaging filter for the "auto-pedestal" function of the CX20125 IC. A resistor 143 provides current limiting for the "back-porch" clamp pulse input signal required by the CX20125 and a resistor 146 provides the same function for the composite blanking pulse input.

Resistors 130, 131, 132 and 133 along with a transistor 160 form an amplifier of auxiliary sync separator 113. A resistor 134 and a capacitor 138 form a low-pass filter for improving the noise immunity of auxiliary sync separator 113. Auxiliary sync separator 113 is of conventional design having a dual time constant for optimizing both horizontal and vertical sync separation. The horizontal time constant is determined by a resistor 140 and a capacitor 139, and the vertical time constant is determined by a resistor 135 and resistor 140 in combination with a capacitor 136 and a diode 137. The base-emitter junction of transistor 141 acts as a comparator for separating the composite sync pulses from composite luma signal 104. Composite sync signal 117 appears at the collector of transistor 141.

Summing amplifier 170 includes a transistor 154 configured as a common base stage. Base bias voltage is provided by a bias network comprising resistors 150 and 153. A filter capacitor 152 is coupled to the bias network. The emitter of transistor 154 forms a virtual ground summing node for non-linear processed composite luma signal 105 produced by IC 110 and composite sync signal 117 produced by auxiliary sync separator 113. Signals 105 and 117 are converted to currents by resistors 149 and 155, respectively. The currents are summed in the emitter of transistor 154. The output voltage of the common base amplifier is developed at the collector of transistor 154 across a load resistor 159 and is buffered by emitter follower configured transistor 156. Output composite luminance signal 112 with corrected sync pulses appears at the emitter of transistor 156 across a load resistor 157.

The function of peak limiter 118 mentioned with regard to FIG. 8b is accomplished by setting the bias of the base of transistor 154 so that transistor 154 is cutoff at a desired level of the sync pulses 117. The base bias is determined by resistors 150 and 153. The gain of amplifier 170 is set to ensure that cutoff is reached in response to sync pulse 117. The gain is set by resistors 155 and 159.

Figure 8F:
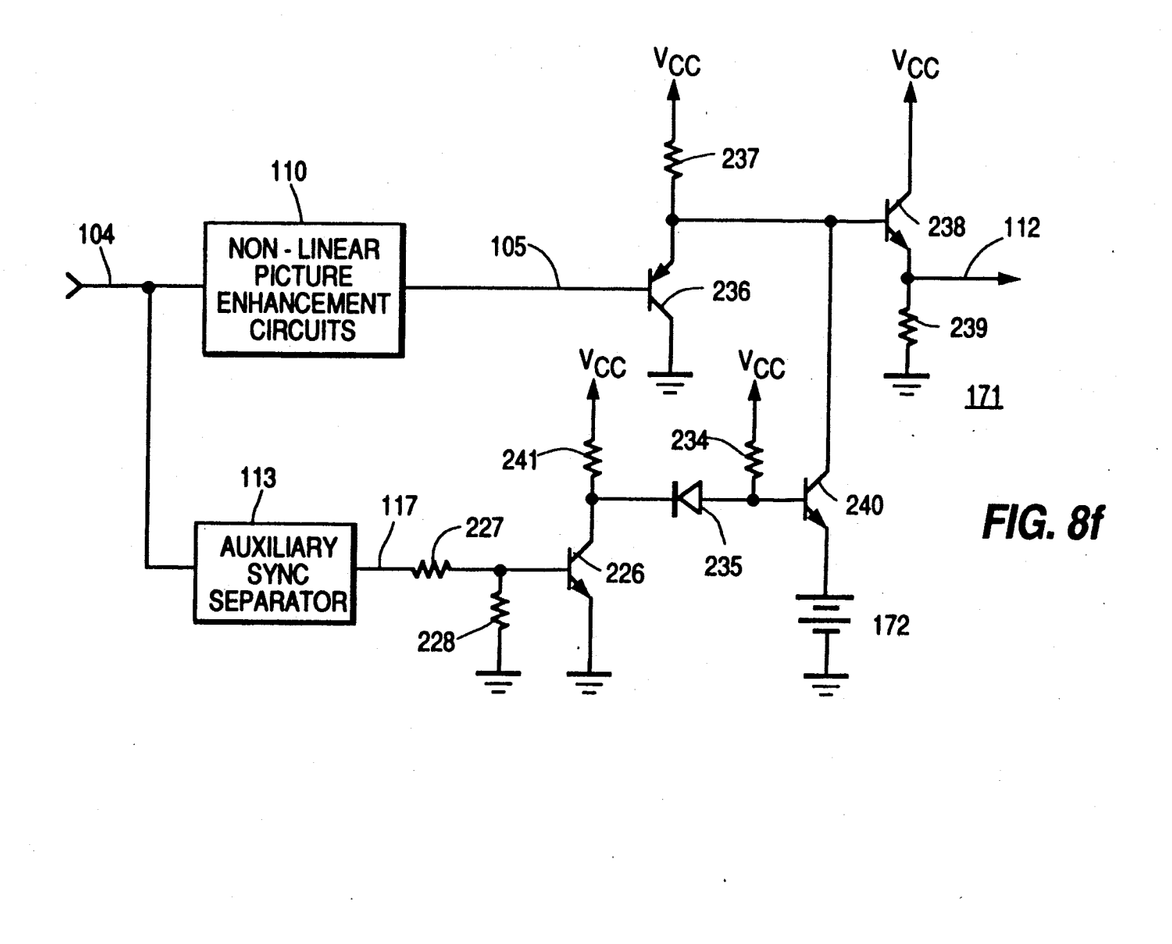

FIG. 8f shows a circuit implementation of the embodiment shown in block form in FIG. 8c. Switch 171 includes a series-shunt switch comprising transistors 236 and 240 and resistor 237, and an emitter follower amplifier comprising a transistor 238 and a resistor 239. The switch is coupled between the output of non-linear processing circuit 110 and output 112 of the sync correction circuit. The switch is controlled by composite sync signal 117 produced by auxiliary sync separator 113. Composite sync signal 117 is coupled to an amplifier including a transistor 226 and a load resistor 241 through a network including resistors 227 and 228. Transistor 226 inverts composite sync signal 117. The inverted signal is coupled to the base of transistor 240 through a network including a resistor 234 and a diode 235. Reference voltage 172 is applied to the emitter of transistor 236. Between sync pulses, composite sync signal 117 produced by auxiliary sync separator 113 has a voltage level near supply voltage $V_{CC}$. As a result, transistor 240 is non-conductive and transistor 236 is conductive, causing the image portions of non-linearly processed luma signal 105 to be coupled to output 112. When negative-going pulses are present at output 117 of auxiliary sync separator 113, transistor 240 conducts causing transistor 236 to be reverse biased because its base voltage is higher than reference voltage 172 coupled to its emitter through conductive transistor 240. Thus, composite luma signal 112 is made equal to voltage 172 minus the base-emitter potential of transistor 238 during the pulse intervals of composite sync signal 117.

The present invention has been described in terms of a non-linear picture enhancement circuit, such as the Sony CX20125 IC, which provides both "black-stretch" non-linear processing and "auto-pedestal" non-linear processing functions. However, it will be appreciated by those skilled in the art, that the invention is useful even when only one of these non-linear processing functions or when another non-linear processing function which affect sync pulses is used. In addition, while the present invention has been described in terms of a composite luminance signal including a sync component, it is applicable to any other composite video signal including a sync component, such as a composite video signal including a chrominance component. These and other modifications are intended to be included within the scope of the invention defined by the following claims.

We claim:

1. In a television system, apparatus comprising:
   means for providing an input composite video signal including an image component and a synchronization pulse component;
   means for non-linearly processing said composite video signal including both of said image and synchronization pulse components to produce a non-linearly processed composite video signal including a non-linearly processed image component and a non-linearly processed synchronization pulse component; said non-linearly processed synchronization pulse component being subject to distortion due to the non-linear processing and thereby being rendered unreliable;
   means for separating said synchronization pulse component of said input composite video signal before it is processed by said non-linear processing means to produce an undistorted synchronization pulse signal; and
   means, including a gain controlled amplifier, responsive to both said non-linearly processed composite video signal, including said non-linearly processed synchronization pulse component, and said undistorted synchronization pulse signal for selectively amplifying individual synchronization pulses of said non-linearly processed synchronization pulse component in response to respective individual synchronization pulses of said undistorted synchronization pulse signal to produce a further composite video signal including a non-linearly processed image component and a reliable synchronization pulse component.

2. The apparatus recited in claim 1, further including:
   means for further processing said further composite video signal, including means for separating said non-linearly processed image component and said reliable synchronization pulse component of said further composite signal.

3. The apparatus recited in claim 2, wherein:
   said further processing means comprises an integrated circuit having an input terminal for receiving said further composite video signal and which is coupled to the inputs of a video signal processing section and a synchronization pulse separator.

4. The apparatus recited in claim 1, wherein:
   said means for producing said further composite video signal includes means for limiting the peak amplitude of said amplified synchronization pulses of said non-linearly processed synchronization pulses to produce said further video signal.

5. In a television system, apparatus comprising:
   means for providing an input composite video signal including an image component and a synchronization pulse component;
   means for processing said composite video signal including both of said image and synchronization pulse components to produce a processed composite video signal including a processed image component and a processed synchronization pulse component; said processed synchronization pulse component being subject to distortion due to the processing and thereby being rendered unreliable;
   means for separating said synchronization pulse component of said input composite video signal before it is processed by said processing means to produce an undistorted synchronization pulse signal; and
   means responsive to both said processed composite video signal, including said processed synchronization pulse component, and said undistorted synchronization pulse signal for individually processing synchronization pulses of said processed synchronization pulse component in response to respective individual synchronization pulses of said undistorted synchronization pulse signal to produce a further composite video signal including a processed image component and a reliable synchronization pulse component;

said means for individually processing synchronization pulses of said processed synchronization pulse component including means for selectively substituting a reference level for individual synchronization pulses of said processed synchronization pulse component in response to respective individual synchronization pulses of said undistorted synchronization pulse signal.

6. In a television system, apparatus comprising:

means for providing an input composite video signal including an image component and a synchronization pulse component;

means for non-linearly processing said composite video signal including both of said image and synchronization pulse components to produce a non-linearly processed composite video signal including a non-linearly processed image component and a non-linearly processed synchronization pulse component; said non-linearly processed synchronization pulse component being subject to distortion due to the processing and thereby being rendered unreliable;

means for separating said synchronization pulse component of said input composite video signal before it is processed by said non-linear processing means to produce an undistorted synchronization pulse signal;

means responsive to both said non-linearly processed composite video signal, including said non-linearly processed synchronization component, and said undistorted synchronization pulse signal for producing a further composite video signal including a non-linearly processed image component and a reliable synchronization pulse component;

said means for producing a further composite video signal including means for selectively substituting a reference level for individual synchronization pulses of said processed synchronization pulse component in response to respective individual synchronization pulses of said undistorted synchronization pulse signal; and means for further processing said further composite video signal, including means for separating said non-linearly processed image component and said reliable synchronization component of said further composite signal;

said further processing means comprising an integrated circuit having an input terminal for receiving said further composite video signal and which is coupled to the inputs of a video signal processing section and a synchronization pulse separator.

7. In a television system, apparatus comprising:

means for providing an input composite video signal including an image component and a synchronization pulse component;

means for non-linearly processing said composite video signal including both of said image and synchronization pulse components to produce a non-linearly processed composite video signal including a non-linearly processed image component and a non-linearly processed synchronization pulse component; said non-linearly processed synchronization pulse component being subject to distortion due to the non-linear processing and thereby being rendered unreliable;

means for separating said synchronization pulse component of said input composite video signal before it is processed by said non-linear processing means to produce an undistorted synchronization pulse signal; and means responsive to both said non-linearly processed composite video signal, including said non-linearly processed synchronization component, and said undistorted synchronization pulse signal for producing a further composite video signal including a non-linearly processed image component and a reliable synchronization pulse component;

said means for producing said further composite video signal including a gain control amplifier for selectively amplifying individual pulses of said non-linearly processed synchronization pulse component of said non-linearly processed composite video signal in response to respective individual synchronization pulses of said undistorted synchronization pulse signal to produce an output signal, and means for limiting the peak amplitude of said output signal to produce said further composite video signal.

* * * * *